United States Patent [19]

Welborn, Jr. et al.

[11] Patent Number: 5,084,534

[45] Date of Patent: Jan. 28, 1992

[54] HIGH PRESSURE, HIGH TEMPERATURE POLYMERIZATION OF ETHYLENE

[75] Inventors: Howard C. Welborn, Jr., Houston; Charles S. Speed, Dayton, both of Tex.

[73] Assignee: Exxon Chemical Patents, Inc., Linden, N.J.

[21] Appl. No.: 93,460

[22] Filed: Sep. 10, 1987

Related U.S. Application Data

[63] Continuation-in-part of Ser. No. 054,785, Jun. 4, 1987 abandoned.

[51] Int. Cl.$^5$ .................. C08F 4/642; C08F 10/02
[52] U.S. Cl. ................. 526/160; 526/339; 526/348.2; 526/348.5; 526/348.6; 526/352; 526/902
[58] Field of Search ......................... 526/160

[56] References Cited

U.S. PATENT DOCUMENTS

| | | | |
|---|---|---|---|
| 4,404,344 | 9/1983 | Sinn et al. | 526/160 |
| 4,530,914 | 7/1985 | Ewen et al. | 526/114 |
| 4,542,199 | 9/1985 | Kaminsky et al. | 526/160 |
| 4,565,647 | 1/1986 | Llenado | 252/354 |
| 4,752,597 | 6/1988 | Turner | 526/160 |
| 4,808,561 | 2/1989 | Welborn | 526/129 |

FOREIGN PATENT DOCUMENTS

| | | |
|---|---|---|
| 0035242 | 9/1981 | European Pat. Off. |
| 129368 | 12/1984 | European Pat. Off. ......... 526/160 |
| 2608863 | 9/1977 | Fed. Rep. of Germany. |
| 2608933 | 9/1977 | Fed. Rep. of Germany. |
| 3150270 | 6/1983 | Fed. Rep. of Germany. |

OTHER PUBLICATIONS

*Ziegler Natta Catalysis* by H. Sinn and W. Kaminski, Advances in Organo Metallic Chemistry, 18, 99 (1980).
Halogen Free Soluble Ziegler Catalysis with Methylalumoxane as Catalysts by J. Herwig and W. Kaminski in Polymer Bulletin 9, 464 (1983).
*Homogeneous Ziegler Natta Catalysis II* by E. Giannetti et al., Journal of Polymer Science, 23, 2117-2133 (1985).
Herwig et al., Polymer Bulletin 9, 464-469 (1983).

*Primary Examiner*—Edward J. Smith
*Attorney, Agent, or Firm*—B. C. Cadenhead; M. B. Kurtzman

[57] ABSTRACT

A process for polymerizing or copolymerizing ethylene, either alone or in combination with other olefins, comprising contacting said ethylene or alpha-olefin, either alone or in combination with other olefins, with a catalyst comprising a cyclopentadienyl-transition metal compound and an alumoxane compound at an elevated temperature and pressure and wherein the ratio of aluminum in the alumoxane to the total metal in the metallocene is in the range of 1000:1 to 0.5:1.

16 Claims, 1 Drawing Sheet

HIGH PRESSURE, HIGH TEMPERATURE POLYMERIZATION OF ETHYLENE

This application is a continuation-in-part of Ser. No. 54,785 filed June 4, 1987.

This invention is a continuation-in-part of application 054,785 filed June 4, 1987, now abandoned.

This invention relates to an improved process for polymerizing olefins. More particularly, this invention relates to a process for polymerizing ethylene, either alone or in combination with other monomers such as alpha-olefins and di-olefins at an elevated temperature and pressure.

DESCRIPTION OF THE PRIOR ART

Heretofore it has been proposed to use certain metallocenes such as bis(cyclopentadienyl) titanium or zirconium dialkyls in combination with aluminum alkyl/water cocatalyst as a homogeneous catalyst system for the polymerization of olefins. For example: German Patent Application 2,608,863 teaches the use of a catalyst system for the polymerization of ethylene consisting of bis(cyclopentadienyl) titanium dialkyl, aluminum trialkyl and water; German Patent Application 2,608,933 teaches an ethylene polymerization catalyst system consisting of zirconium metallocenes of the general formula (cyclopentadienyl)$_n$ZrYphd 4-n, wherein n stands for a integer in the range of 1 to 4, Y for R, $CH_2AlR_2$, $CH_2CH_2AlR_2$ and $CH_2CH(AlR_2)_2$, wherein R stands for alkyl or metallo alkyl, an aluminum trialkyl cocatalyst and water; European Patent Application No. 0035242 teaches a process for preparing ethylene and atactic propylene polymers in the presence of a halogen-free Ziegler catalyst system of (1) cyclopentadienyl compound of the formula (cyclopentadienyl)$_n$MeY$_{4-n}$ in which n is an integer from 1 to 4, Me is a transition metal, especially zirconium, and Y is either hydrogen, a $C_1$-$C_5$ alkyl or metallo alkyl group or a radical having the following general formula $CH_2AlR_2$, and $CH_2CH_2(AlR_2)_2$ in which R represents a $C_1$-$C_5$ alkyl or metallo alkyl group, and (2) an alumoxane; and U.S. Pat. No. 4,564,647 teaches a low pressure process for polymerizing ethylene, either alone or in combination with small amounts of other alpha-olefins, in the presence of a catalyst which may comprise a cyclopentadienyl compound, represented by the formula (Cp)MR'R$^2$R$^3$ wherein (Cp) represents a cyclopentadienyl group, M represents titanium, vanadium, zirconium or hafnium, and R', R$^2$ and R$^3$ are each an alkyl group having from 1 to 6 carbon atoms, a cyclopentadienyl group, a halogen atom or a hydrogen atom, an alumoxane, which can be prepared by reacting trialkyl aluminum or dialkyl aluminum monohalide with water and a filler. Each of the above patents also teach that the polymerization process employing the homogeneous catalyst system is hydrogen sensitive thereby providing a means to control polymer molecular weight.

As is well known in the prior art, catalyst systems comprising a cyclopentadienyl compound, hereinafter frequently referred to as a metallocene or metallocene catalyst component, and an alumoxane offer several distinct advantages when compared to the more conventional Ziegler-type catalyst systems. For example, the cyclopentadienyl-transition metal/alumoxane catalyst systems, particularly those wherein cyclopentadienyl compound contains at least one halogen atom, have demonstrated extremely high activity in the polymerization of alpha-olefins, particularly ethylene. Moreover, these catalyst systems produce relatively high yields of polymer product having a relatively narrow molecular weight distribution. Concomitant with the advantages, however, is the fact that at any given set of polymerization conditions heretofore contemplated for these catalyst systems, the molecular weight of the polymer product is generally lower than the molecular weight of the polymer product produced with a more conventional Ziegler-type catalyst at the same conditions. Moreover, while relatively high molecular weight polymers can be produced with catalyst systems comprising a cyclopentadienyl-transition metal compound and an alumoxane compound at conditions heretofore contemplated for use thereof, polymerizations performed at higher temperatures result in the production of low molecular weight products, such as waxes and oligomers, rather than the desired high molecular weight products in the typical plastic applications. Each of German Patent Applications 2,608,933 and 2,608,863, European published Patent Application 35242, Ziegler-Natta Catalysis, by H. Sinn and H. Kaminsky, in Advances in Organometallic Chemistry, 18, 99(1980), Halogen-Free Soluble Ziegler Catalysis with Methylalumoxane as Catalyst, by J. Herwig and W. Kaminsky, in Polymer Bulletin, 9, 464( 1983) show that polymer product molecular weight decreases to wax and oligomeric levels at elevated reaction temperatures such as those described in the Examples in this patent application.

A particular problem associated with the teachings of the prior art relating to the catalyst systems comprising a cyclopentadienyl-transition metal compound and an alumoxane compound is that in order to obtain useful catalytic productivities the ratio of alumoxane to metallocene must be very high. The prior art exemplifies ratios of 2500:1 and greater as being useful and clearly teaches that increasing catalytic productivity is obtained with increasing alumoxane-metallocene ratio. See for example, E. Giannetti et al., Homogeneous Ziegler-Natta Catalysis. II Ethylene Polymerization by IVB Transition Metal complexes/Methyl Aluminoxane Catalyst Systems, J.Poly. Sci. 23, 2117-2133 (1985). Such an excess of alumoxane results in poor resin quality and high costs associated with the deashing of polymer product. Additionally, the cost of polymerization becomes excessive because of the high cost of alumoxane. Erdolchemie German 3,150,270 A1 demonstrates that at high pressures and high temperatures one can obtain high molecular weight polymers product, but nevertheless the process as demonstrated employs the high ratio of alumoxane to metallocene as suggested in the prior art and obtains productivities ranging from 90 to 250 g polymer/g catalyst.

The need, then, for an improved polymerization process that both retains the several advantages heretofore achieved with catalyst systems comprising a cyclopentadienyl-transition metal compound and an alumoxane compound and which permits the efficient and economically attractive production of high molecular weight polymer products, i.e., at high productivity ( 1000 g polymer/g catalyst or greater) is readily apparent.

SUMMARY OF THE INVENTION

It has now surprisingly been discovered that the aforementioned high molecular weight polymers can be obtained, while the disadvantages of the prior art processes can be avoided or at least significantly reduced, with the method of the present invention, thereby resulting in an improved process for polymerizing alpha-olefins, either alone or in combination with other comonomers. It is, therefore, an object of this invention to provide an improved process for the polymerization and copolymerization of alpha-olefins, either alone or in combination with other comonomers. It is another object of this invention to provide such an improved process wherein relatively high molecular weight polymer products can be produced. It is still another object of this invention to provide such a process wherein the advantages normally associated with the use of a catalyst system comprising a cyclopentadienyl-transition metal compound and an alumoxane compound are retained. The foregoing and other objects and advantages will become apparent from the description, including the Examples, set forth hereinafter.

In accordance with the present invention, the foregoing and other objects and advantages are accomplished by polymerizing ethylene, either alone or in combination with other monomers such as alpha-olefins having from 3-10 carbon atoms, i.e., butene-1, hexene-1, octene-1, 4-methylpentene-1, decene-1 and norbornene and di-olefins having 4-10 carbon atoms, i.e., 1,3-butadiene, 1,4-hexadiene, 4-methyl-1,4-hexadiene, 5-methyl-1,4-hexadiene, 1,7-octadiene, ethylidiene norbornene and norbornadiene in the presence of a catalyst system comprising a cyclopentadienyl-transition metal compound and an alumoxane compound at elevated temperatures and pressures. As indicated more fully hereinafter, it is important, in the process of this invention, that the polymerization temperature be above about 120° C. but below the decomposition temperature of said product and that the polymerization pressure be above about 500 bar ( kg/cm$^2$) . In those situations wherein the molecular weight of the polymer product that would be produced at a given set of operating conditions is higher than desired, any of the techniques known in the prior art for control of molecular weight, such as the use of hydrogen, may be used in the process of this invention.

DETAILED DESCRIPTION OF THE INVENTION

Figure 1:
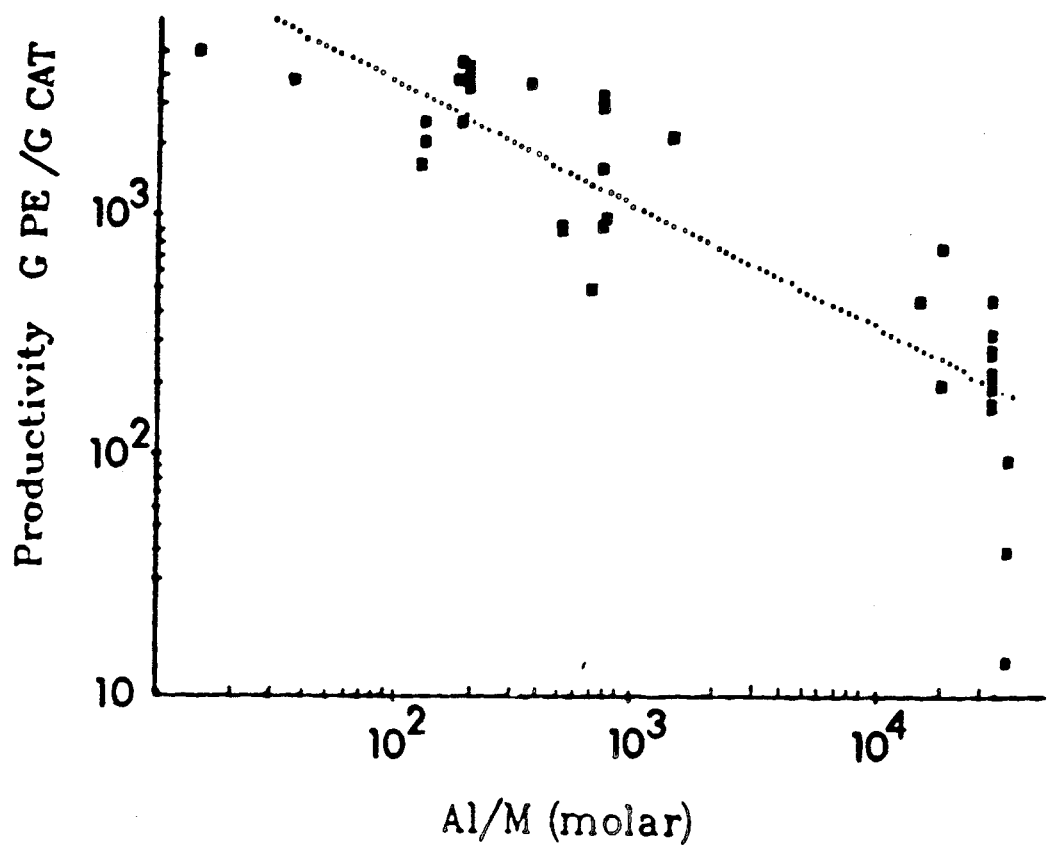

As indicated, supra, the present invention relates to an improved process for polymerizing ethylene, either alone or in combination with other monomers such as alpha-olefins and di-olefins, in the presence of a catalyst comprising a cyclopentadienyl-transition metal compound and an alumoxane compound at elevated temperatures and pressures. As also indicated, supra, the polymerization will be accomplished at a temperature above the melting point of the polymer product but below the decomposition temperature of said polymer product and at a pressure equal to or above about 500 bar.

In the process of the present invention, ethylene, either alone or together with alpha-olefins having 3 or more carbon atoms or di-olefins having 4 or more carbon atoms, is polymerized in the presence of a catalyst system comprising at least one metallocene and an alumoxane. In accordance with this invention, one can also produce olefin copolymers particularly copolymers of ethylene and higher alpha-olefins having from 3-18 carbon atoms and copolymers of ethylene and di-olefins having from 4 to 18 carbon atoms. As indicated infra, the comonomer content can be controlled through the selection of metallocene catalyst component and by controlling the partial pressure of the various monomers.

The metallocenes employed in the production of the reaction product are organometallic coordination compounds which are cyclopentadienyl derivatives of a Group 4b or Group 5b metal of the Periodic Table of the Elements ( 56th Edition of Handbook of Chemistry and Physics, CRC Press [1975]) and include mono, di and tricyclopentadienyls and their derivatives of the transition metals. Particularly desirable are the metallocene of a Group 4b and 5b metal such as titanium, zirconium, hafnium, and vanadium. The alumoxanes employed in forming the reaction product with the metallocenes are themselves the reaction products of an aluminum trialkyl with water.

In general, the process of this invention employs at least one metallocene compound in the formation of the catalyst. As indicated, supra, metallocene is a metal derivative of a cyclopentadiene. The metallocenes usefully employed in accordance with this invention contain at least one cyclopentadiene ring. The metal is selected from the Group 4b and/or 5b metals, preferably titanium, zirconium, hafnium, and vanadium, and most preferably titanium and zirconium. The cyclopentadienyl ring can be unsubstituted or contain one or more substituents such as, for example, a hydrocarbyl substituent or other substituents such as, for example, a trialkyl silyl substituent. The metallocene can contain one, two, or three cyclopentadienyl rings however two rings are preferred.

Useful metallocenes can be represented by the general formulas:

$(Cp)_m(MR_nX_q)$     (I)

wherein Cp is a cyclopenta ring, M is a Group 4b or 5b transition metal, R is a hydrocarbyl group or hydrocarboxy having from 1 to 20 carbon atoms, X is a halogen, and m is a whole number from 1 to 3, n is a whole number from 0 to 3, and q is a whole number from 0 to 3.

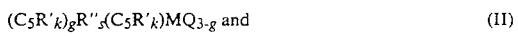
$(C_5R'_k)_gR''_s(C_5R'_k)MQ_{3-g}$ and     (II)

$R''_s(C_5R'_k)_2MQ'$     (III)

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$-$C_6$ ring, R'' is $C_1$-$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, Q' is an alkylidene radical having from 1 to about 20 carbon atoms, s is 0 or 1, g is 0,1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred.

Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis (cyclopentadienyl)titanium dimethyl, bis(cyclopentadienyl)titanium diphenyl, bis(cyclopentadienyl)zirconium dimethyl, bis(cyclopentadienyl) zirconium diphenyl, bis(cyclopentadienyl) hafnium dimethyl and diphenyl, bis(cyclopentadienyl) titanium di-neopentyl, bis(cyclopentadienyl) zirconium di-neopentyl, bis(cyclopentadienyl) titanium dibenzyl, bis(cyclopentadienyl) zirconium dibenzyl, bis(cyclopentadienyl) vanadium dimethyl, the mono alkyl metallocenes such as bis(cyclopentadienyl) titanium methyl chloride, bis(cyclopentadienyl) titanium ethyl chloride bis(cyclopentadienyl) titanium phenyl chloride, bis(cyclopentadienyl) zirconium hydrochloride, bis( cyclo-pentadienyl) zirconium methyl chloride, bis( cyclopentadienyl) zirconium ethyl chloride, bis(cyclopentadienyl) zirconium phenyl chloride, bis (cyclopentadienyl) titanium methyl bromide, bis(cyclopentadienyl) titanium methyl iodide, bis(cyclopentadienyl) titanium ethyl bromide, bis(cyclopentadienyl) titanium ethyl iodide, bis(cyclopentadienyl) titanium phenyl bromide, bis(cyclopentadienyl) titanium phenyl iodide, bis(cyclopentadienyl) zirconium methyl bromide, bis(cyclopentadienyl) -zirconium methyl iodide, bis(cyclopentadienyl) zirconium ethyl bromide, bis(cyclopentadienyl) zirconium ethyl iodide, bis(cyclopentadienyl) zirconium phenyl bromide, bis(cyclopentadienyl) zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed in accordance with this invention are monocyclopentadienyls titanocenes such as, pentamethylcyclopentadienyl titanium trichloride, bis(pentaethylcyclopentadienyl) titanium titanium diphenyl, the carbene represented by the formula bis(cyclopentadienyl) titanium=CH$_2$ and derivatives of this reagent such as bis(cyclopentadienyl) Ti=CH$_2$. Al(CH$_3$)$_3$, (Cp$_2$TiCH$_2$)$_2$,

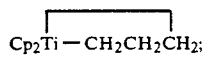

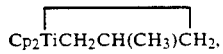

substitued bis((Cp)Ti(IV) compounds such as bis(indenyl)yttanium diphenyl or dichloride, bis( methylcyclopentadienyl) titanium diphenyl or dihalides, dialkyl, trialkyl, tetra-alkyl and penta-alkyl cyclopentadienyl titanium compounds such as bis( 1,2-dimethylcyclopentadienyl) titanium diphenyl or dichloride, bis(1,2-diethylcyclopentadienyl) titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed in accordance with this invention are, pentamethylcyclopentadienyl zirconium trichloride, pentaethylcyclopentadienyl zirconium trichloride, the alkyl substituted cyclopentadienes, such as bis(ethylcyclopentadienyl) zirconium dimethyl, bis( B-phenylpropylcyclopentadienyl) zirconium dimethyl, bis(methylcyclopentadienyl) zirconium dimethyl, bis(n-butylcyclopentadienyl) zirconium dimethyl, bis(cyclohexylmethylcyclopentadienyl) zirconium dimethyl, bis(n-octylcyclopentadienyl) zirconium dimethyl, and haloalkyl and dihydride, and dihalide complexes of the above., dialkyl, trialkyl, tetra-alkyl, and penta-alkyl cyclopentadienes, such as bis(pentamethylcyclopentadienyl) zirconium diphenyl, bis(pentamethylcyclopentadienyl) zirconium dimethyl, bis(1,2-dimethylcyclopentadienyl) zirconium dimethyl and mono and dihalide and hydride complexes of the above., silicon, phosphorus, and carbon bridged cyclopentadiene complexes such as dimethylsilyl dicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis( trimethylsilylcyclopentadienyl)zirconium dichloride and dimethyl, bis(1,3 di-trimethylsilyl cyclopentadienyl) zirconium dichloride and dimethyl and bis( 1,2,4-tri-trimethylsilylcyclopentadienyl)zirconium dichloride and dimethyl. Carbenes represented by the formulae Cp$_2$Zr=CH$_2$P(C$_6$H$_5$)$_2$CH$_3$, and derivatives of these compounds such as

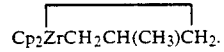

Mixed cyclopentadienyl compouns such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride.

Bis(cyclopentadienyl) hafnium dichloride, bis(cyclopentadienyl) hafnium dimethyl, bis(cyclopentadienyl) vanadium dichloride and the like are illustrative of other metallocenes.

Some preferred metallocenes are
bis(cyclopentadienyl)zirconium dimethyl,
bis(cyclopentadienyl)zirconium dichloride,
bis(cyclopentadienyl)titanium dichloride,
bis(methylcyclopentadienyl)zirconium dichloride,
bis(methylcyclopentadienyl)titanium dichloride,
bis(n-butylcyclopentadienyl)zirconium dichloride,
dimethylsilyldicyclopentadienyl zirconium dichloride,
bis(trimethylsilycyclopentadienyl)zirconium dichloride and
dimethylsilyldicyclopentadienyl titanium dichloride.
bis( indenyl) zirconium dichloride,
bis(4,5,6,7-tetrahydroindenyl) zirconium dichloride, the racemic and/or meso isomer of 1,2-ethylene-bridged bis(4,5,6,7-tetrahydroindenyl) zirconium dichloride, the racemic and/or meso isomer of 1,1-dimethylsilyl-bridged bis(4,5,6,7-tetrahydroindenyl) zirconium dichloride.

The alumoxane compounds useful in the process of this invention may be cyclic or linear. Cyclic alumoxanes may be represented by the general formula $(R-Al-O)_n$ while linear alumoxanes may be represented by the general formula $R(R-Al-O)_nAlR_2$. In the general formula R is a $C_1-C_5$ alkyl group such as, for example, methyl, ethyl, propyl, butyl and pentyl and n is an integer from 1 to about 20. Preferably, R is methyl and n is 4-18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The ratio of aluminum in the alumoxane to total metal in the metallocenes which can be usefully employed can be in the range of about 0.5:1 to about 1000:1, and desirably about 1:1 to about 100:1. Preferably, the ratio will be in the range of 50:1 to about 5:1 and most preferably 20:1 to 5:1. In accordance with this invention, it has been discovered that not only can one obtain high molecular weight product while polymerizing at high temperatures, but that one can also obtain increasing catalytic productivities with decreasing alumoxane-metallocene ratio to about 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Since in accordance with this invention, one can produce high molecular weight polymer product at relatively high temperature, temperature does not constitute a limiting parameter as with the prior art metallocene/alumoxane catalyst. The catalyst systems described herein, therefore, are suitable for the polymerization of olefins in solution over a wide range of temperatures and pressures. As indicated, supra, however, it is desirable that the temperature be above about 150° C. to about 350° C., but below the decomposition temperature of said polymer product, typically from about 310° C. to about 325° C. Preferably, the polymerization will be completed at a temperature within the range from about 180° C. to about 280° C. As also indicated, supra, the polymerization will be completed at a pressure above about 500 bar, and generally at a pressure within the range from about 500 bar to about 3500 bar. Preferably, the polymerization will be completed at a pressure within the range from about 800 bar to about 1500 bar.

After polymerization and deactivation of the catalyst, the product polymer can be recovered by processes well known in the art. Any excess reactants may be flashed off from the polymer and the polymer obtained extruded into water and cut into pellets or other suitable comminuted shapes. Pigments, antioxidants and other additives, as is known in the art, may be added to the polymer.

The polymer product obtained in accordance with this invention will have a weight average molecular weight in the range of about 10,000 to about 1,500,000 and preferably 80,000 to about 1,000,000. The polydispersities (molecular weight distribution) expressed as Mw/Mn are typically from 1.5 to 3.0. The polymers may contain chain end unsaturation if no hydrogen is used during the polymerization. Broadened MH can be obtained by employing two or more of the metal cyclopentadienyls in combination with the alumoxane as described in U.S. Pat. Ser. No. 4,530,914 entitled Process and Catalyst for Producing Polyethylene having a Broad Molecular Weight Distribution. The polymers produced by the process of this present invention are capable of being fabricated into a wide variety of articles, as is known for homopolymers of ethylene and copolymers of ethylene and higher alpha-olefins.

EXAMPLES

In the Examples following the alumoxane employed was prepared by adding 76.5 grams ferrous sulfate heptahydrate in 4 equally spaced increments over a 2 hour period to a rapidly stirred 2 liter round-bottom flask containing 1 liter of a 13.1 weight percent solution of trimethylaluminum (TMA) in toluene. The flask was maintained at 50° C. and under a nitrogen atmosphere. Methane produced was continuously vented. Upon completion of the addition of ferrous sulfate heptahydrate, the flask was continuously stirred and maintained at a temperature of 80° C. for 6 hours. The reaction mixture was cooled to room temperature and was allowed to settle. The clear solution containing the alumoxane was separated by decantation from the insoluble solids.

Molecular weights were determined on a Hater's Associates Model No. 150C GPC (Gel Permeation Chromatography). The measurements were obtained by dissolving polymer samples in hot trichlorobenzene and filtered. The GPC runs are performed at 145° C. in trichlorobenzene at 1.0 ml/min flow using styragel columns from Perkin Elmer, Inc. 3.1% solutions (300 microliters of trichlorobenzene solution) were injected and the samples were run in duplicate. The integration parameters were obtained with a Hewlett-Packard Data Module.

EXAMPLE 1

In this example a stirred 100cc steel autoclave reaction vessel which was equipped to perform Ziegler polymerization reactions at pressures up to 2500 bar and temperatures up to 300° C was used. The reaction system was supplied with a thermocouple and pressure transducer to measure temperature and pressure continuously, and with means to supply purified compressed ethylene, nitrogen, hydrogen and any comonomer desired. Equipment for rapidly introducing premeasured volumes of catalyst, and equipment for rapidly venting the contents of the reactor and collecting the polymer product were also a part of the reaction system. In this Example, the polymerization was performed in pure ethylene without the addition of a solvent. In this Example 1, the temperature of the cleaned reactor containing ethylene at low pressure was equilibrated at the desired reaction temperature of 150° C. The catalyst solution was prepared by mixing 0.180 mg of solid bis(n-butylcyclopentadienyl)zirconium dichloride with 10.0cc of 0.8M methylalumoxane solution in toluene in an inert atmosphere. A 0.40cc portion of this catalyst solution was transferred by low pressure nitrogen into the constant volume injection tube, which was held at 25° C. During this run, ethylene was pressured into the autoclave at a total pressure of 1500 bar. The reactor contents were stirred at 1000 rpm for one minute at which time the entire catalyst solution was rapidly injected into the stirring reactor with excess pressure. The temperature and pressure changes were recorded continuously for 120 seconds at which time the contents were rapidly vented yielding the polymer. The reactor was washed with xylene to collect any polymer remaining inside and all polymer was dried in vacuo. The yield was 3.54 g of polyethylene which had weight average molecular weight of 131,000, a polydispersity of 1.8 and a density of 0.955 g/cc. The conditions employed in this and the following Examples 2-25, as well as the results obtained, are summarized in Table I.

EXAMPLE 2

In this Example, the procedure used in Example 1 was repeated except that only 0.090 mg of bis( n-butylcyclopentadienyl) zirconium were mixed with the lOcc solution methylalumoxane. The yield was 0.72 g of polyethylene having a weight average molecular weight of 185,000, a polydispersity of 1.9 and a density of 0.959 g/cc.

EXAMPLE 3

In this Example, the procedure used in Example 2 was repeated except that the autoclave was heated to a temperature of 230° C. rather than 150° C. The yield was 1.71 g of polyethylene having a weight average molecular weight of 114,000, a polydisperisty of 2.0 and a density of 0.959 g/cc.

EXAMPLE 4

In this Example, the procedure of Example 2 was repeated except that 10.0 mole % of 1-octene, based on ethylene, was inJected into the autoclave with a syringe prior to the addition of ethylene. The yuield was 0.25 g of an ethylene/octene copolymer having a weight average molecular weight of 182,000, a polydispersity of 1.9 and a density of 0.945 g/cc.

EXAMPLE 5

In this Example, the procedure of Example 4 was repeated except that 5.0 mole % of of 1-octene, based on ethylene, was injected into the autoclave with a syringe prior to the addition of ethylene rather than the 10.0 mole % used in Example 4. The yield was 13.1 g of an ethylene/octene copolymer having a weight average molecular weight of 202,000, a polydispersity of 1.9 and a density of 0.950 g/cc.

EXAMPLE 6

In this Example, the procedure of Example 1 was repeated except that the autoclave was heated to 200° C. rather than 150° C, 0.440 mg of bis(n-butylcyclopentadienyl)zirconium dichloride was added to Just 1cc of 0.8M methylalumoxane solution, rather than 0.180 mg added to 10cc of solution, and 9.0cc of toluene were added to the catalyst mixture. Again, 0.40cc of this catalyst mixture ( 10.0cc total volume) was transferred into the catalyst injection tube. The yield was 5.1 g of polyethylene having a weight average molecular weight of 119,000, a polydispersity of 2.4 and a density of 0.958 g/cc.

EXAMPLE 7

In this Example, the procedure of Example 6 was repeated except that 2.0cc 0.8M methylalumoxane solution was used, rather than 1.0cc, and only 8.0cc of toluene was added to the catalyst mixture rather than 9.0cc. The yield was 7.53 g of polyethylene having a weight average molecular weight of 98,000, a polydispersity of 1.9 and a density of 0.957 g/cc.

EXAMPLE 8

In this Example, the procedure of Example 1 was repeated except that the autoclave was heated to 200° C., rather than 150° C. and only 0.110 mg of bis(n-butylcyclopentadienyl) zirconium dichloride was used, rather than 0.180 mg thereof as in Example 1. The yield was 3.70 g of polyethylene having a weight average molecular weight of 100,000, a polydispersity of 2.0 and a density of 0.958g/cc.

EXAMPLE 9

In this Example, the procedure of Example 8 was repeated except that a nominal holding time of 40 seconds, rather than 120 seconds was used. The yield was 3.41 g of polyethylene having a weight average molecular weight of 96,000, a polydispersity of 1.9 and a density of 0.958 g/cc.

EXAMPLE 10

In this Example, the procedure of Example 8 was repeated except that a nominal holding time of 20 seconds, rather than 120 seconds, was used. The yield was 2.72 g of polyethylene having a weight average molecular weight of 94,200, a polydispersity of 1.9 and a density of 0.959 g/cc.

EXAMPLE 11

In this Example, the procedure of Example 8 was repeated except that only 5.0cc of a 0.8M solution of methylalumoxane was used, rather than 10cc thereof as in Example 8, and 5.0cc of toluene was added to the catalyst mixture. The yield was 4.00 g of polyethylene having a weight average molecular weight of 103,000, a polydispersity of 2.0 and a density of 0.958 g/cc.

EXAMPLE 12

In this Example, the procedure of Example 6 was repeated except that a nominal holding time of 40 seconds, rather than 120 seconds, was used. The yield was 2.87 g of polyethylene having a weight average molecular weight of 103,000, a polydispersity of 2.2 and a density of 0.958 g/cc.

EXAMPLE 13

In this Example, the procedure of Example 6 was repeated except that a nominal holding time of 20 seconds was used, rather than 120 seconds as was used in Example 6. The yield was 1.61 g of polyethylene having a weight average molecular weight of 126,000, a polydispersity of 2.1 and a density of 0.957 g/cc.

EXAMPLE 14

In this Example, the procedure of Example 8 was repeated except that the autoclave was heated only to 180° C, rather than 200° C. as was used in Example 8 and the ethylene pressure was reduced from 1500 bar to 1000 bar. The yield was 4.00 g of polyethylene having a weight average molecular weight of 106,000, a polydispersity of 2.1 and a density of 0.958 g/cc.

EXAMPLE 15

In this Example, the procedure of Example 6 was repeated except that only 0.25cc of 0.8M methylalumoxane, rather than the 1.0cc used in Example 6 and 9.75cc of toluene was added to the catalyst mixture, rather than the 9.0 cc used in example 6. The yield was 1.09 g of polyethylene having a weight average molecular weight of 129,000, a polydispersity of 2.2 and a density of 0.959 g/cc.

EXAMPLE 16

In this Example, the procedure of Example 6 was repeated except that only 0.5cc of 0.8M solution of methylalumoxane was used, rather than the 1.0cc used in Example 6, and 9.5cc of toluene was added to the catalyst mixture, rather than the 9.0cc which was added in Example 6. The yield was 3.18 g of polyethylene having a weight average molecular weight of 112,000, a polydispersity of 2.2 and density of 0.958 g/cc.

EXAMPLE 17

In this Example, the procedure of Example 6 was repeated. The yield was 5.60 g of polyethylene, having a weight average molecular weight of 98,000, and a polydispersity of 1.9 and a density of 0.959 g/cc.

EXAMPLE 18

In this Example, the procedure of Example 8 was repeated except that the ethylene pressure was reduced from 1500 bar to 500 bar. The yield was 2.97 g of polyethylene having a weight average molecular weight of 100,000, a polydispersity of 2.1 and a density of 0.95B g/cc.

EXAMPLE 19

In this Example, the procedure of Example 8 was repeated except that the ethylene pressure was reduced from 1500 bar to 1000 bar. The yield was 5.70 g of polyethylene having a weight average molecular weight of 112,000, a polydispersity of 2.2 and a density of 0.957 g/cc.

EXAMPLE 20

In this Example, the procedure of Example 8 was repeated except that hydrogen, at a partial pressure of 9.6 bar, was introduced to the autoclave with the ethylene. The yield was 4.90 g of polyethylene having a weight average molecular weight of 15,000 a polydispersity of 2.3 and a density of 0.961.

EXAMPLE 21

In this Example, the procedure of example 8 was repeated except that hydrogen, at a partial pressure of 32 bar, was introduced into the autoclave with the ethylene. The yield was 7.93 g of polyethylene having a weight average molecular weight of 4,000, a polydispersity of 2.9 and a density of 0.965 g/cc.

EXAMPLE 22

In this Example, the procedure of Example B was repeated except that 20.0 mole %, based on ethylene, of 1-hexene was injected into the autoclave with a syringe prior to the addition of ethylene. The yield was 4.78 g of a copolymer of ethylene/hexene having a weight average molecular weight of 85,000, a polydispersity of 2.3 and a density of 0.943 g/cc.

EXAMPLE 23

In this Example, the procedure of Example 22 was repeated except that 50.0 mole % of 1-hexene based on ethylene, was used rather than the 20.0 mole % of 1-hexene, used in Example 22. The yield was 4.93 g of a copolymer of ethylene/hexene having a weight average molecular weight of 76,000, a polydispersity of 2.1 and a density of 0.939 g/cc.

EXAMPLE 24

In this Example, the procedure of Example 22 was repeated except that 1,4-hexadiene was substituted for 1-hexene used in Example 22. The yield was 4.71 g of a copolymer of ethylene/hexadiene having a weight average molecular weight of 86,400, a polydispersity of 2.1 and a density of 0.945 g/cc.

EXAMPLE 25

In this Example, the procedure of Example 24 was repeated except that 50.0 mole % 1,4-hexadiene, based on ethylene, was used rather than the 20.0 mole % 1,4-hexadiene which was used in Example 24. The yield was 5.53 g of a copolymer of ethylene/hexadiene having a weight average molecular weight of 83,400, a polydispersity of 2.2 and a density of 0.940 g/cc.

EXAMPLE 26

In this Example a stirred 1000cc steel autoclave reaction vessel which was equipped to perform continuous Ziegler polymerization reactions at pressures up to 2500 bar and temperatures up to 300° C. was used. The reaction system was supplied with a thermocouple and pressure transducer to measure temperature and pressure continuously, and with means to supply continuously purified compressed ethylene, hydrogen, and 1-hexene. Equipment for continuously introducing a measured flow of catalyst solution and equipment for rapidly venting and quenching the reaction and of collecting the polymer product were also a part of the reaction system. In this Example, the polymerization was performed with a molar ratio of ethylene to 1-hexene of 1.0 without the addition of a solvent. In this Example, the temperature of the cleaned reactor containing ethylene and 1-hexene was equilibrated at the desired reaction temperature of 180° C. The catalyst solution was prepared by mixing 422.6 mg of solid bis( n-butylcyclopentadienyl) zirconium dichloride with 1.0 liter of 0.8M methylalumoxane solution in 10 liters toluene in an inert atmosphere. This catalyst solution was continuously fed by a high pressure pump into the reactor at a rate of 660 cc/hour which resulted in a temperature of 180° C. in the reactor. During this run, ethylene and 1-hexene were pressured into the autoclave at a total pressure of 1000 bar at a mass flow rate of 50 kg/hour. The reactor contents were stirred at 1000 rpm. The yield of polymer product was 2.9 kg/hour of an ethylene-1-hexene copolymer which had weight average molecular weight of 57,718, a polydispersity of 2.3 and a density of 0.9244 g/cc. The conditions employed in this and the following Examples 27-41, as well as the results obtained, are summarized in Table II. FIG. 1 visually demonstrates the increasing productivities obtained contrary to the teachings of the prior art by reducing the Al-metallocene ratio.

EXAMPLE 27

In this Example, the procedure used in Example 26 was repeated except that only 416.4 mg of bridged ( dimethylsilyldicyclo pentadienyl) zirconium were substituted for the metallocene of Example 26. The yield was 3.3 kg/hour of ethylene-1-hexene copolymer having a weight average molecular weight of 11,200, a polydispersity of 3.9 and a density of 0.9361 g/cc.

EXAMPLE 28

In this Example, the procedure used in Example 26 was repeated except that 456.3 mg of bis( cyclopentadienyl) zirconium dichloride was substituted for the metallocene of Example 26. The yield was 3.1 kg/hour of ethylene-1-hexene copolymer having a weight average molecular weight of 37,380, a polydisperisty of 2.1 and a density of 0.9312 g/cc.

EXAMPLE 29

In this Example, the procedure of Example 28 was repeated except that the total pressure was increased to 1500 bar. The yield was 2.9 kg/hour of an ethylene-1-hexene copolymer having a weight average molecular weight of 43,881, a polydispersity of 2.1 and a density of 0.92B2 g/cc.

EXAMPLE 30

In this Example, the procedure of Example 29 was repeated except that the catalyst was prepared using 444.8 mg of bis(cyclopentadienyl) zirconium dichloride, 0.25 liter methylalumoxane solution and 5.0 liters of toluene. The yield was 2.8 kg/hour of an ethylene-1-hexene copolymer having a weight average molecular weight of 46,077, a polydispersity of 2.1 and a density of 0.92B3 g/cc.

EXAMPLE 31

In this Example, the procedure of Example 29 was repeated except that the autoclave was pressurized to a total pressure of 2000 bar. The yield was 2.6 kg/hour of ethylene-1-hexene copolymer having a weight average molecular weight of 51,500, a polydispersity of 2.1 and a density of 0.9262 g/cc.

EXAMPLE 32

In this Example, the procedure of Example 29 was repeated except that a total pressure of 2500 bar was used. The yield was 2.9 kg/hour of ethylene-1-hexene copolymer having a weight average molecular weight of 50,200, a polydispersity of 2.0 and a density of 0.9243 g/cc.

EXAMPLE 33

In this Example, the procedure of Example 26 was repeated except that 804.3 mg of bis(n-butylcyclopentadienyl) zirconium dichloride, 0.50 liters of methylalumoxane solution, and 15.0 liters of toluene were used to prepare the catalyst. A total pressure of 2000 bar was used. The yield was 2.5 kg/hour of ethylene-1-hexene copolymer having a weight average molecular weight of 76,200, a polydispersity of 2.0 and a density of 0.9201 g/cc.

EXAMPLE 34

In this Example, the procedure of Example 33 was repeated except that a total pressure of 2500 bar was used. The yield was 2.9 kg/hour of ethylene-1-hexene copolymer having a weight average molecular weight of 77,200, a polydispersity of 1.9 and a density of 0.9180 g/cc.

EXAMPLE 35

In this Example, the procedure of Example 34 was repeated except that a 1-hexene to ethylene molar ratio of 1.6 rather than 1.0 was used. The yield was 3.0 kg/hour of ethylene-1-hexene copolymer having a weight average molecular weight of 59,400, a polydispersity of 1.9 and a density of 0.9084 g/cc.

EXAMPLE 36

In this Example, the procedure of Example 34 was repeated except that a temperature of 170° C. rather than 18020 C. was used. The yield was 1.9 kg/hour of ethylene-1-hexene copolymer having a weight average molecular weight of 72,900, a polydispersity of 1.8 and a density of 0.9107 g/cc.

EXAMPLE 37

In this Example, the procedure of Example 36 was repeated except that the catalyst was prepared using 857.8 mg of bis(n-butylcyclopentadienyl) zirconium dichloride. The yield was 3.0 kg/hour of ethylene-1-hexene copolymer having a weight average molecular weight of 73,200, a polydispersity of 1.9 and a density of 0.9055 g/cc.

EXAMPLE 38

In this Example, the procedure of Example 36 was repeated except that the catalyst was prepared using 873.9 mg of bis(n-butylcyclopentadienyl) zirconium dichloride, and a 1-hexene to ethylene molar ratio of 2.0 was used rather than 1.6. The yield was 3.7 kg/hour of ethylene-1-hexene copolymer having a weight average molecular weight of 54,100, a polydispersity of 1.9 and a density of 0.9000 g/cc.

EXAMPLE 39

In this Example, the procedure of Example 38 was repeated except that the catalyst was prepared by mixing 2458.4 mg of bis(n-butylcyclopentadienyl) zirconium dichloride, 0.30 liters of methylalumoxane solution and 15.0 liters of toluene. The yield was 4.0 kg/hour of ethylene-1-hexene copolymer having a weight average molecular weight of 54,200, a polydispersity of 2.0 and a density of 0.9028 g/cc.

EXAMPLE 40

In this Example, the procedure of Example 38 was repeated except that the catalyst was prepared by mixing 2443.4 mg of bis(n-butylcyclopentadienyl) zirconium dichloride, 0.12 liters of methylalumoxane solution and 10.0 liters of toluene. The yield was 3.9 kg/hour of ethylene-1-hexene copolymer having a weight average molecular weight of 55,200, a polydispersity of 2.0 and a density of 0.9045 g/cc.

EXAMPLE 41

In this Example, the procedure of Example 36 was repeated except that the catalyst was prepared by mixing 4714.2 mg of bis(methylcyclopentadienyl) titanium dichloride, 0.85 liters of methylalumoxane solution and 10.0 liters of toluene. The yield was 2.6 kg/hour of ethylene-1-hexene copolymer having a weight average molecular weight of 30,100, a polydispersity of 2.4 and density of 0.9241 g/cc.

Table III demonstrates the relationship of Al/M ratio and productivities.

EXAMPLE 42

In this Example a stirred 1000cc steel autoclave reaction vessel which was equipped to perform continuous Ziegler polymerization reactions at pressures up to 2500 bar and temperatures up to 300° C. was used. The reaction system was supplied with a thermocouple and pressure transducer to measure temperature and pressure continuously, and with means to supply continuously purified compressed ethylene, hydrogen, and 1-butene or 1-propene. Equipment for continuously introducing a measured flow of catalyst solution and equipment for rapidly venting and quenching the reaction and of collecting the polymer product were also a part of the reaction system. In this Example, the polymerization was performed with a molar ratio of ethylene to 1-butene of 1.8 without the addition of a solvent. In this Example, the temperature of the cleaned reactor containing ethylene and 1-butene was equilibrated at the desired reaction temperature of 180° C. The catalyst solution was prepared by mixing 1.60 g of solid bis(methylcyclopentadienyl) zirconium dichloride with 0.4 liter of 0.8M methylalumoxane solution in 10 liters toluene in an inert atmosphere. This catalyst solution was continuously fed by a high pressure pump into the reactor at a rate of 1300 cc/hour which resulted in a temperature of 180° C. in the reactor. During this run, ethylene and 1-butene were pressured into the autoclave at a total pressure of 1300 bar at a mass flow rate of 50 kg/hour. The reactor contents were stirred at 1000 rpm. The yield of polymer product was 3.5 kg/hour of an ethylene-1-butene copolymer which had weight average molecular weight of 43,663, a polydispersity of 2.0 and a density of 0.913 g/cc. The conditions employed in this and the following Examples 43-47, as well as the results obtained, are summarized in Table IV.

EXAMPLE 43

In this Example, the procedure of Example 42 was repeated except that the catalyst was prepared using 2.13 g of racemic 1,2-ethylene bridged bis( 4,5,6,7-tetrahydroindenyl) zirconium dichloride. The yield was 3.5 kg/hour of ethylene-1-butene copolymer having a weight average molecular weight of 36,721, a polydispersity of 1.7 and a density of 0.9010 g/cc.

EXAMPLE 44

In this Example, the procedure of Example 42 was repeated except that the catalyst was prepared using 7.96 g of bis(indenyl) zirconium dichloride. The yield was 3.5 kg/hour of ethylene-1-butene copolymer having a weight average molecular weight of 43,913, a polydispersity of 2.2 and a density of 0.9128 g/cc.

EXAMPLE 45

In this Example, the procedure of Example 42 was repeated except that the catalyst was prepared by mixing 1.81 g of (pentamethylcyclopentadienyl) (cyclopentadienyl) zirconium dichloride. The yield was 3.5 kg/hour of ethylene-1-butene copolymer having a weight average molecular weight of 85,887, a polydispersity of 2.1 and a density of 0.9215 g/cc.

EXAMPLE 46

In this Example, the procedure of Example 42 was repeated except that the catalyst was prepared by mixing 1.67 g of 1,1-dimethylsilyl bridged bis( 4,5,6,7-tetrahydroindenyl) zirconium dichloride. The yield was 3.5 kg/hour of ethylene-1-butene copolymer having a weight average molecular weight of 42,125, a polydispersity of 1.8 and a density of 0.8938 g/cc.

EXAMPLE 47

In this Example, the procedure of Example 42 was repeated except that the catalyst was prepared by mixing 2.57 g of bis(cyclopentadienyl) hafnium dimethyl. The yield was 3.5 kg/hour of ethylene-1-butene copolymer having a weight average molecular weight of 38,176, a polydispersity of 2.1 and a density of 0.9030 g/cc.

The Examples demonstrate that at high pressures and temperatures high molecular weight polymer product can be obtained at productivities of 1000 and greater by employing catalyst systems having a relatively low Al/metal ratio.

While the present invention has been described and illustrated by reference to particular embodiments thereof, it will be appreciated by those of ordinary skill in the art that the invention lends itself to variations not necessarily illustrated herein. For this reason, then, reference should be made solely to the appended claims for purposes of determining the true scope of the present invention.

TABLE I

| Example | T (°C.) | Solid[1] (mg) | Al Sol'n[2] (cc) | Toluene (cc) | Al/M (molar) | Comonomer (type) | Comonomer (mole %) | Hydrogen (bar) | $P_t$ (bar)[3] | Time (sec) | Yield (g) | Mw | MWD | Density (g/cc) |
|---|---|---|---|---|---|---|---|---|---|---|---|---|---|---|
| 1 | 150 | 0.180 | 10.0 | 0 | 17,960 | — | — | 0 | 1500 | 120 | 3.54 | 131,000 | 1.8 | 0.955 |
| 2 | 150 | 0.090 | 10.0 | 0 | 35,910 | — | — | 0 | 1500 | 120 | 0.72 | 185,000 | 1.9 | 0.959 |
| 3 | 230 | 0.090 | 10.0 | 0 | 35,910 | — | — | 0 | 1500 | 120 | 1.71 | 114,000 | 2.0 | 0.959 |
| 4 | 150 | 0.090 | 10.0 | 0 | 35,910 | 1-octene. | 10.0 | 0 | 1500 | 120 | 0.25 | 182,000 | 1.9 | 0.945 |
| 5 | 150 | 0.180 | 10.0 | 0 | 17,960 | 1-octene. | 5.0 | 0 | 1500 | 120 | 13.1 | 202,000 | 1.9 | 0.950 |
| 6 | 200 | 0.440 | 1.0 | 9.0 | 740 | — | — | 0 | 1500 | 120 | 5.10 | 119,000 | 2.4 | 0.958 |
| 7 | 200 | 0.440 | 2.0 | 8.0 | 1470 | — | — | 0 | 1500 | 120 | 7.53 | 98,000 | 1.9 | 0.957 |
| 8 | 200 | 0.110 | 10.0 | 0 | 29,390 | — | — | 0 | 1500 | 120 | 3.70 | 100,000 | 2.0 | 0.958 |
| 9 | 200 | 0.110 | 10.0 | 0 | 29,390 | — | — | 0 | 1500 | 40 | 3.41 | 96,000 | 1.9 | 0.958 |
| 10 | 200 | 0.110 | 10.0 | 0 | 29,390 | — | — | 0 | 1500 | 20 | 2.72 | 94,200 | 1.9 | 0.959 |
| 11 | 200 | 0.110 | 5.0 | 5.0 | 14,690 | — | — | 0 | 1500 | 120 | 4.00 | 103,000 | 2.0 | 0.958 |
| 12 | 200 | 0.440 | 1.0 | 9.0 | 740 | — | — | 0 | 1500 | 40 | 2.87 | 103,000 | 2.2 | 0.958 |

TABLE I-continued

| Example | T (°C.) | Solid[1] (mg) | Al Sol'n[2] (cc) | Toluene (cc) | Al/M (molar) | Comonomer (type, | mole %) | Hydrogen (bar) | P_t (bar)[3] | Time (sec) | Yield (g) | Mw | MWD | Density (g/cc) |
|---|---|---|---|---|---|---|---|---|---|---|---|---|---|---|
| 13 | 200 | 0.440 | 1.0 | 9.0 | 740 | — | — | 0 | 1500 | 20 | 1.61 | 126,000 | 2.1 | 0.957 |
| 14 | 180 | 0.110 | 10.0 | 0. | 29,390 | — | — | 0 | 1000 | 120 | 4.00 | 106,000 | 2.1 | 0.958 |
| 15 | 200 | 0.440 | 0.25 | 9.75 | 190 | — | — | 0 | 1500 | 120 | 1.09 | 129,000 | 2.2 | 0.959 |
| 16 | 200 | 0.440 | 0.50 | 9.50 | 370 | — | — | 0 | 1500 | 120 | 3.18 | 112,000 | 2.2 | 0.958 |
| 17 | 200 | 0.440 | 1.0 | 9.0 | 740 | — | — | 0 | 1500 | 120 | 5.60 | 98,000 | 1.9 | 0.959 |
| 18 | 200 | 0.110 | 10.0 | 0 | 29,390 | — | — | 0 | 500 | 120 | 2.97 | 100,000 | 2.1 | 0.958 |
| 19 | 200 | 0.110 | 10.0 | 0 | 29,390 | — | — | 0 | 1000 | 120 | 5.70 | 112,000 | 2.2 | 0.957 |
| 20 | 200 | 0.110 | 10.0 | 0 | 29,390 | — | — | 9.6 | 1500 | 120 | 4.90 | 15,000 | 2.3 | 0.961 |
| 21 | 200 | 0.110 | 10.0 | 0 | 29,390 | — | — | 32.0 | 1500 | 120 | 7.93 | 4,000 | 2.9 | 0.965 |
| 22 | 200 | 0.110 | 10.0 | 0 | 29,390 | 1-hexene, | 20.0 | 0 | 1500 | 120 | 4.78 | 85,000 | 2.3 | 0.943 |
| 23 | 200 | 0.110 | 10.0 | 0 | 29,390 | 1-hexene, | 20.0 | 0 | 1500 | 120 | 4.93 | 76,000 | 2.1 | 0.939 |
| 24 | 200 | 0.110 | 10.0 | 0 | 29,390 | 1,4-hexadiene, | 20.0 | 0 | 1500 | 120 | 4.71 | 86,400 | 2.1 | 0.945 |
| 25 | 200 | 0.110 | 10.0 | 0 | 29,390 | 1,4-hexadiene, | 50.0 | 0 | 1500 | 120 | 5.53 | 83,400 | 2.2 | 0.940 |

[1]bis(n-butylcyclopentadienyl) zirconium dichloride
[2]0.8 M/l aluminum as methylalumoxane, dissolved in toluene
[3]P_t equals total reactor pressure

TABLE II

| Example | T (°C.) | Solid[1] (mg) | Al Sol'n[2] (liter) | Al/M (molar) | Total Vol (liters) toluene | Cat. Sol'n Feed Rate (cc/hr) | Comonomer (type, mole %) | Hydrogen (bar) | P_t (bar)[3] | Res. Time (sec) | Yield (kg/hr) | Mw | MWD | Density (g/cc) |
|---|---|---|---|---|---|---|---|---|---|---|---|---|---|---|
| 26 | 180 | 422.6 | 1.0 | 760 | 10.0 | 660 | 1-hexene, 50.0 | 0 | 1000 | 50 | 2.9 | 57,718 | 2.3 | 0.9244 |
| 27 | 180 | 416.4 | 1.0 | 670 | 10.0 | 1500 | 1-hexene, 50.0 | 0 | 1000 | 50 | 3.3 | 11,200 | 3.9 | 0.9361 |
| 28 | 180 | 456.3 | 1.0 | 510 | 10.0 | 970 | 1-hexene, 50.0 | 0 | 1000 | 50 | 3.1 | 37,400 | 2.1 | 0.9312 |
| 29 | 180 | 456.3 | 1.0 | 510 | 10.0 | 700 | 1-hexene, 50.0 | 0 | 1500 | 50 | 2.9 | 43,900 | 2.1 | 0.9282 |
| 30 | 180 | 444.8 | 0.25 | 131 | 5.0 | 740 | 1-hexene, 50.0 | 0 | 1500 | 50 | 2.8 | 46,100 | 2.1 | 0.9283 |
| 31 | 180 | 863.3 | 0.50 | 135 | 10.0 | 540 | 1-hexene, 50.0 | 0 | 2000 | 50 | 2.6 | 51,500 | 2.1 | 0.9262 |
| 32 | 180 | 863.3 | 0.50 | 135 | 10.0 | 500 | 1-hexene, 50.0 | 0 | 2500 | 50 | 2.9 | 50,200 | 2.0 | 0.9243 |
| 33 | 180 | 804.3 | 0.50 | 200 | 15.0 | 430 | 1-hexene, 50.0 | 0 | 2000 | 50 | 2.5 | 76,200 | 2.0 | 0.9201 |
| 34 | 180 | 804.3 | 0.50 | 200 | 15.0 | 440 | 1-hexene, 50.0 | 0 | 2500 | 50 | 2.9 | 77,200 | 1.9 | 0.9180 |
| 35 | 180 | 804.3 | 0.50 | 200 | 15.0 | 510 | 1-hexene, 61.5 | 0 | 2500 | 50 | 3.0 | 59,400 | 1.9 | 0.9084 |
| 36 | 170 | 804.3 | 0.50 | 200 | 15.0 | 360 | 1-hexene, 61.5 | 0 | 2500 | 50 | 1.9 | 72,900 | 1.8 | 0.9107 |
| 37 | 170 | 857.8 | 0.50 | 188 | 15.0 | 440 | 1-hexene, 61.5 | 0 | 2500 | 50 | 3.0 | 73,200 | 1.9 | 0.9055 |
| 38 | 170 | 873.9 | 0.50 | 185 | 15.0 | 660 | 1-hexene, 66.7 | 0 | 2500 | 50 | 3.7 | 54,100 | 1.9 | 0.9000 |
| 39 | 170 | 2458.4 | 0.30 | 39 | 15.0 | 1047 | 1-hexene, 66.7 | 0 | 2500 | 50 | 4.0 | 54,200 | 2.0 | 0.9028 |
| 40 | 170 | 2443.4 | 0.12 | 16 | 10.0 | 1020 | 1-hexene, 66.7 | 0 | 2500 | 50 | 3.9 | 55,200 | 2.0 | 0.9045 |
| 41 | 170 | 4714.2 | 0.85 | 40 | 10.0 | 3700 | 1-hexene, 61.5 | 0 | 2500 | 50 | 2.6 | 30,100 | 2.4 | 0.9241 |

[1]transition metal metallocenes as given in the example
[2]0.8 M/l aluminum as methylalumoxane, dissolved in toluene
[3]P_t equals reactor pressure

TABLE III

| Example No. | Al/M (molar) | Productivity (g Polymer/g catalyst) |
|---|---|---|
| 1 | 17960 | 190 |
| 2 | 35910 | 38 |
| 3 | 35910 | 92 |
| 4 | 35910 | 13 |
| 5 | 17960 | 705 |
| 6 | 740 | 2750 |
| 7 | 1470 | 2030 |
| 8 | 29390 | 200 |
| 9 | 29390 | 185 |
| 10 | 29390 | 150 |
| 11 | 14690 | 430 |
| 12 | 740 | 1550 |
| 13 | 740 | 870 |
| 14 | 29390 | 215 |
| 15 | 190 | 2350 |
| 16 | 370 | 3425 |
| 17 | 740 | 3020 |
| 18 | 29390 | 160 |
| 19 | 29390 | 310 |
| 20 | 29390 | 260 |
| 21 | 29390 | 425 |
| 22 | 29390 | 260 |
| 23 | 29390 | 265 |
| 24 | 29390 | 255 |
| 25 | 29390 | 300 |
| 26 | 760 | 940 |
| 27 | 670 | 470 |
| 28 | 510 | 850 |
| 29 | 510 | 885 |
| 30 | 131 | 1574 |
| 31 | 135 | 2000 |
| 32 | 135 | 2400 |
| 33 | 200 | 3630 |
| 34 | 200 | 4120 |
| 35 | 200 | 3665 |
| 36 | 200 | 3320 |
| 37 | 188 | 4280 |
| 38 | 185 | 3520 |
| 39 | 39 | 3522 |
| 40 | 16 | 4800 |

TABLE IV

| Example No. | Al/M (molar) | Productivity (g Polymer/g catalyst) |
|---|---|---|
| 42 | 75 | 2100 |
| 43 | 75 | 2100 |
| 44 | 75 | 1920 |
| 45 | 75 | 2690 |
| 46 | 100 | 2700 |
| 47 | 75 | 780 |

What is claimed is:

1. A process for polymerizing ethylene, either alone or in combination with one or more other olefins, said process comprising contacting said ethylene either, alone or in combination with one or more other olefins, with a catalyst comprising a cyclopentadienyl-group 4b transition metal compound and an alumoxane wherein the molar ratio of aluminum in the alumoxane to the total metal in the transition metal compound is in the range of 1000:1 to 0.5:1 at a temperature greater than 120° C. and a pressure of about 500 bar or greater.

2. The process of claim 1 wherein the molar ratio is in the range of 100:1 to 1:1.

3. The process of claim 2 wherein the molar ratio is in the range of 50:1 to 1:1.

4. The process of claim 1 wherein said pressure is above about 500 bar and the temperature is in the range of 150° C. to 300° C.

5. The process of claim 1 wherien siad pressure is within the range from about 500 bar to about 3500 bar.

6. The process of claim 5 wherein said pressure is in the range of 550 to about 3500 bar.

7. The process of claim 4 wherien the temperature is in the range of 180° C. to 280°.

8. The process of claim 1 wherein said cyclopentadienyl-transition metal compound can be represented by one of the following general formulae:

$$(Cp)_m MR_n X_q \quad (I)$$

wherein Cp is a cyclopentadienyl ring, M is a Group 4b transisiton metal, R is a hydrocarbyl group or hydrocarboxy having from 1 to 20 carbon atoms, X is a halogen, and m is a whole number from 1 to 3, n is a whole number from 0 to 3, and q is a whole number from 0 to 3.

$$(C_5R'_k)_g R''_s (C_5R'_k) MQ_{3-g} \text{ and} \quad (II)$$

$$R''_s (C_5R'_k)_2 MQ' \quad (III)$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, silicon containing hydrocarbyl radicals, or a hydrocarbyl radical wherein two carbon atoms are joined together to form a $C_4-C_6$ ring, R" is a $C_1-C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0,1 or 2, s is 0 when g is 0, k is 4 when s is 1, and k is 5 when s is 0, and M is as defined above.

9. The process of claim 8 wherein said alumoxane can be represented by one of the following formulae:

$$(R-al-O)_n \text{ and} \quad I$$

$$(R(R-Al-O)_n AlR_2 \quad II$$

p1 wherein R is a $C_1-C_5$ alkyl group and n is an integer from 2 to about 20.

10. The process of claim 9 wherein said transition metal is selected from the group of metals consisting of titanium and zirconium.

11. The process of claim 10 wherien said transition metal is zirconium.

12. The process of claim 8 wherein said cyclopentadienyl compound may be represented by formula I and m is 2, n is 0 and q is 2.

13. The process of claim 12 wherein X is chlorine.

14. The process of claim 9 wherein R is methyl and n is greater than or equal 4.

15. The process of claim 8 wherein the cyclopentadienyl transition metal compound is selected from one of bis(cyclopentadienyl) zirconium dimethyl, bis(cyclopentadienyl) ziconium dichloride, bis(cyclopentadienyl)titanium dichloride, bis(methylcyclopentadienyl) zirconium dichloride, bis(methylcyclopentadienyl) titanium dichloride, bis(n-butylcyclopentadienyl) zircnium dichloride, dimethylsilyldicyclopentadienyl zirconium dichloride, bis(trimethylsilylcyclopentadienyl)zirconium dichloride, dimethylsilyldicyclopentadienyl titanium dichloride or mixtures thereof.

16. The process of claim 9 where n is 4 or greater.

* * * * *